United States Patent
Aigouy et al.

(10) Patent No.: US 9,784,409 B2
(45) Date of Patent: Oct. 10, 2017

(54) TANK FILLING DEVICE AND METHOD

(71) Applicant: L'Air Liquide, Societe Anonyme pour l'Etude et l'Exploitation des Procedes Georges Claude, Paris (FR)

(72) Inventors: Gerald Aigouy, La Croix de la Rochette (FR); James Butterworth, Fountaine (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 387 days.

(21) Appl. No.: 14/386,515

(22) PCT Filed: Feb. 28, 2013

(86) PCT No.: PCT/FR2013/050412
§ 371 (c)(1),
(2) Date: Sep. 19, 2014

(87) PCT Pub. No.: WO2013/144470
PCT Pub. Date: Oct. 3, 2013

(65) Prior Publication Data
US 2015/0068641 A1    Mar. 12, 2015

(30) Foreign Application Priority Data
Mar. 27, 2012    (FR) ...................... 12 52709

(51) Int. Cl.
*F17C 5/06*    (2006.01)

(52) U.S. Cl.
CPC .......... *F17C 5/06* (2013.01); *F17C 2221/012* (2013.01); *F17C 2223/0123* (2013.01);
(Continued)

(58) Field of Classification Search
CPC ...... F17C 5/02; F17C 5/04; F17C 5/06; F17C 5/007; F17C 2227/0358; F17C 2309/1421; F17C 2270/902
(Continued)

(56) References Cited

U.S. PATENT DOCUMENTS 3,871,179 A     3/1975   Bland
6,668,581 B1 *  12/2003  Acharya ............ C01B 13/0248
                                                          62/615

(Continued)

FOREIGN PATENT DOCUMENTS

WO   WO 2010/146448    12/2010
WO   WO 2011/049466    4/2011

OTHER PUBLICATIONS

International Search Report for PCT/FR2013/050412, mailed May 8, 2013.

*Primary Examiner* — Frantz Jules
*Assistant Examiner* — Brian King
(74) *Attorney, Agent, or Firm* — Christopher J. Cronin

(57) ABSTRACT

A device for filling a tank with a pressurized gas, in particular with pressurized hydrogen, comprising a pressurized-gas source and a circuit for transferring gas from the source to the tank, the transfer circuit including a member for expanding and cooling the gas in order to lower the pressure and temperature of the gas from the source to respective values determined with a view to filling the tank, characterized in that the gas-expansion and cooling member includes a refrigerator that expands the gas by means of a Stirling or Ericsson thermodynamic cycle, the refrigerator being selectively supplied with gas from the source, and in that at least a portion of the cooled and expanded gas supplied to the tank is extracted from the refrigerator.

26 Claims, 4 Drawing Sheets

Figure 1:
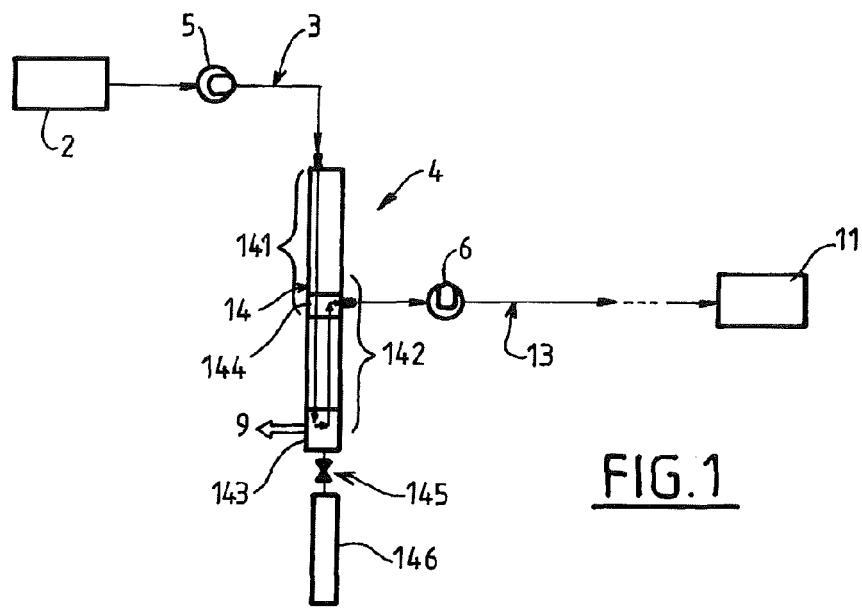

(52) U.S. Cl.
CPC  *F17C 2223/036* (2013.01); *F17C 2225/0123* (2013.01); *F17C 2225/036* (2013.01); *F17C 2227/0157* (2013.01); *F17C 2227/0358* (2013.01); *F17C 2227/0388* (2013.01); *F17C 2227/047* (2013.01); *F17C 2250/0626* (2013.01); *F17C 2260/023* (2013.01); *F17C 2260/025* (2013.01); *F17C 2265/065* (2013.01); *F17C 2270/01* (2013.01); *F17C 2270/0168* (2013.01); *F17C 2270/0184* (2013.01); *Y02E 60/321* (2013.01)

(58) Field of Classification Search
USPC .......................................... 62/606, 607, 608
See application file for complete search history.

(56) References Cited

U.S. PATENT DOCUMENTS

| | | |
|---|---|---|
| 2006/0016512 A1 | 1/2006 | Takano et al. |
| 2007/0257043 A1 | 11/2007 | Kanoya et al. |
| 2010/0307636 A1 | 12/2010 | Uemura |

\* cited by examiner

TANK FILLING DEVICE AND METHOD

The present invention relates to a device and a method for filling a tank.

More specifically, the invention relates to a device for filling a tank with a pressurized gas, in particular with pressurized hydrogen, comprising a pressurized-gas source and a circuit for transferring gas from the source to the tank, the transfer circuit including a member for expanding and cooling the gas in order to lower the pressure and temperature of the gas from the source to respective values determined with a view to filling the tank.

The invention applies in particular to filling tanks of high-pressure hydrogen gas, for example filling tanks at pressures of between 200 and 1000 bar, for example between 300 and 800 bar.

In particular for motor vehicle applications using hydrogen as an energy source, such tanks have to be filled relatively quickly (a few minutes). The adiabatic compression of the hydrogen causes heating that may be incompatible with the structural features of the tank. Slow filling (several tens of minutes) that limits such heating is however incompatible with the requirements of users at a service station, for example. For these reasons, the filling of such tanks has to be carefully controlled.

Filling generally uses one or more compressors and/or buffer volumes to enable the tank to be filled "in cascade". A known solution notably involves cooling the high-pressure gas before it enters the tank to compensate for the heating.

Cooling is typically achieved using a cooling unit or a store of liquid nitrogen and a cooling loop.

However, this equipment is relatively costly and difficult to control to achieve quick filling that is sufficiently efficient.

One objective of this invention is to mitigate some or all of the drawbacks of the prior art as set out above. For this purpose, the device according to the invention, in addition to matching the generic definition provided in the preamble above, is essentially characterized in that the gas expansion and cooling member includes a refrigerator ensuring expansion of the gas using a Stirling or Ericsson thermodynamic cycle, in which the refrigerator is supplied selectively with gas from the source, and in which at least a portion of the cooled and expanded gas supplied to the tank is extracted from the refrigerator.

This feature is very useful, in particular for quickly filling high-pressure tanks, such as those used in hydrogen-distribution stations for motor vehicles. The invention proposed makes it possible to achieve, from a source pressurized to 1000 bar for example, expansion and cooling able to fill the tank of an empty motor vehicle with hydrogen up to 850 bar for example, in less than three minutes. During this procedure, the expansion valve formed by the refrigerator supplies cold gas by extracting the pressure energy from the gas, which prevents the tank from being overheated by the rapid filling. Indeed, since existing hydrogen distribution methods cannot be implemented using expansion valves performing conventional energy extraction, the overheating of the tanks is avoided using cooling systems that are more costly and more complex from a technical and logistical point of view, such as cooling units or liquid nitrogen. The invention proposed enables this drawback to be overcome in part or in full.

"Refrigeration" or "refrigerator" refers to the thermodynamic process for producing cold by means of a Stirling or Ericsson thermodynamic cycle, notably used in cryogenic facilities.

In a cooling installation, the cycle gas is first compressed, ideally isothermally at ambient temperature. The compressed gas is expanded with energy extraction to produce the cold gas, which is used as a coolant to cool a thermal system or to pre-cool different temperature stages within a staged refrigerator.

A Claude-cycle refrigerator and derivatives thereof can combine several thermodynamic cycles, such as Brayton and Joule Thomson cycles. In a cogeneration installation for producing heat and electricity, one of the methods usually implemented involves compressing and heating a gas to a higher temperature before expanding it. In this case, expansion with energy extraction enables the gas to be cooled to a lower temperature level before it is reinjected into the cycle or used as a heat transfer fluid for a thermal system operating at a lower temperature (for example between 30° C. and 100° C.). Typically, the high-pressure, high-temperature gas is used as a heat transfer fluid for an application operating at high temperature, then the expanded gas at a lower temperature is used as a heat transfer fluid for an application operating at a moderate temperature.

The expansion of a gas from a given pressure point to a lower pressure point with energy extraction is currently implemented with two technologies. The first includes rotating machines (turbines with rotation mechanisms) and the second includes mechanical expansion valves (pistons with axial translation mechanisms). Moving the rotary mechanism (turbine) or translational mechanism (piston) operated by the volumetric expansion of the gas makes it possible to convert pressure energy into mechanical energy. This mechanical energy produced can be recovered in the form of heat using a compression system with an exchanger, an electricity system with an alternator or, where appropriate, directly as motive force. This conversion of pressure energy produces mechanical energy and cold gas at a lower pressure and temperature level. Since the mechanical energy produced is extracted from the gas, the gas comes out of the expansion valve at a lower energy level.

The main drawback of the known expansion valves described above lies in the limitation of the pressure drop that can be withstood by moving parts and mechanisms (generally up to around 100 bar). This limitation makes installations more complex, requiring them to stage pressure drops over several expansion valves arranged in series. The invention proposed enables this drawback to be overcome in full.

Accordingly, the invention proposes a technology that extracts energy by converting the pressure energy of the gas using the Stirling or Ericsson cycle. The device uses expansion with energy extraction, for example according to at least one of the following criteria:
  the feed gas is supplied at a given pressure and temperature and is expanded, for example in full, to a lower pressure and temperature level,
  the converted pressure energy is extracted in the form of heat, electricity or, where appropriate, motive force,
  the expanded gas can be used as coolant in a refrigeration installation or as heat transfer fluid in a cogeneration installation,
  the expansion thus performed using a Stirling or Ericsson cycle may be combined with the other conventionally used thermodynamic cycles, such as the Claude cycle and derivatives thereof, the Brayton, Joule Thomson, Gay Iussac, Rankine and Lenoir cycles, or any other thermodynamic cycle performing one or more expansions with energy extraction.

The device according to the invention enables pressure drops not exceeding 1000 bar by limiting the use of movable mechanical parts.

The invention may also relate to a cooling or cogeneration method and installation for the combined production of refrigeration, heat and electricity. More specifically, the invention may concern a method for a refrigeration or cogeneration installation that expands the gas from a given pressure level to a lower pressure level and extracts mechanical energy in the form of heat or electricity. The expansion of gas with energy extraction in the form of heat or electricity causes the expanded gas to cool to a lower temperature level.

Furthermore, the embodiments of the invention may have one or more of the following features:
- the refrigerator is a thermoacoustic expansion valve,
- the refrigerator is a "pulse tube" expansion valve,
- the gas expansion and cooling member includes at least one refrigerator comprising a cold end, with at least a portion of the gas supplied to the tank being taken from a gas outlet at the cold end,
- the gas expansion and cooling member includes at least one refrigerator comprising a cold end, in which at least a portion of the gas supplied to the tank is taken from a zone of the refrigerator other than the cold end, the gas taken being cooled by heat exchange with said cold end,
- the gas expansion and cooling member includes a first and a second refrigerator each of which expands and cools the gas using a Stirling or Ericsson thermodynamic cycle, each refrigerator having a respective cold end, in which at least a portion of the gas supplied to the tank is taken from a zone of the first refrigerator other than the cold end thereof and supplies gas to the second refrigerator, at least a portion of the gas supplied to the tank being taken from the cold end of the second refrigerator,
- the cold end of the first refrigerator is in heat exchange relationship with the second refrigerator in a zone of the second refrigerator other than the cold end thereof,
- the gas expansion and cooling member includes at least one pulse-tube refrigerator including a regenerator supplied selectively with gas from the source, a pulse tube linked to the regenerator, a phase-shift mechanism linked to the pulse tube, the pulse-tube refrigerator having a cold end and a hot end,
- the pressurized-gas source includes at least one of the following:
- at least one pressurized gas tank,
- a gas compression member linked to a gas supply, implemented before the phase in which the gas is transferred to the tank to be filled,
- the pressurized gas source includes a gas compression system implemented during the phase in which the gas is transferred to the tank to be filled,
- the gas transfer circuit includes, between the source and the expansion and cooling member, at least one valve for selectively controlling the gas flow, in particular a rotary valve,
- the gas transfer circuit includes, between the expansion and cooling member and the tank, at least one valve for selectively controlling the gas flow, in particular a rotary valve,
- the gas transfer circuit includes, between the expansion and cooling member and the tank, at least one valve for regulating the pressure of the gas delivered to the tank, in particular a valve for reducing pressure to a fixed or adjustable level,
- the gas transfer circuit includes, between the source and the expansion and cooling member, at least one pressure regulating valve such as a reducing valve designed to reduce the pressure of the gas outputted from the tank to a fixed or adjustable level, preferably 50 bar less than the pressure value within the source,
- the gas expansion and cooling member includes a transfer valve, in particular a rotary valve located between the first and second refrigerators arranged in series, to selectively control the gas taken from the first refrigerator and intended to supply the second refrigerator with gas,
- the hot end of at least one refrigerator is in heat exchange relationship with a selective cooler, in particular a cooling loop fitted with a radiator and/or a cooling unit such as a frigories store,
- the at least one refrigerator is a movable mechanical piston refrigerator performing a Stirling or Ericsson work cycle,
- the at least one refrigerator includes a pulse tube with a free-piston phase shifter cooperating with a resonant flexible bearing,
- the at least one refrigerator includes a pulse-tube refrigerator including a buffer-tank phase shifter linked to the pulse tube via an orifice or an inertance pipe.
- the at least one refrigerator includes a pulse-tube refrigerator having a concentric structure, i.e. in which the pulse tube is arranged about the regenerator,
- at least a portion of the gas taken from a zone of the first refrigerator other than the cold end thereof and that supplies the second refrigerator with gas is cooled before it enters the second refrigerator by heat exchange with the cold end of the first refrigerator, the gas supplied to the tank being taken from a point of the second refrigerator other than the cold end thereof, said gas taken from the second refrigerator being cooled before it enters the tank via a heat exchange with the cold end of the second refrigerator,
- the source has at least one gas storage tank at a pressure of between 200 bar and 1200 bar, and preferably between 400 bar and 1000 bar.

The invention also relates to a method for filling a tank with a pressurized gas, notably with pressurized hydrogen, in which the pressurized gas from a source of pressurized gas is transferred to the tank via a gas transfer circuit, and in which the pressurized gas from the source is expanded and cooled before it enters the tank to be filled, the high-pressure gas from the source being expanded and cooled via at least one refrigerator expanding the gas using a Stirling or Ericsson thermodynamic cycle.

According to other possible features:
- the at least one refrigerator is supplied selectively with gas from the source, the expanded and cooled gas supplied to the tank having passed through the at least one refrigerator,
- the source of pressurized gas includes a recipient containing the gas at a pressure of between 200 and 1200 bar and/or includes a compressor supplying the gas at a pressure of between 200 and 1200 bar,
- before supplying the refrigerator or refrigerators, the pressure of the gas coming from the source is adjusted to a first specific pressure below the pressure of the source, for example 20 to 100 bar less than the pressure of the source, the refrigerator expands the gas to a second specific pressure between 100 bar and 300 bar, the flow rate and/or the temperature of the gas supplied to the tank is controlled by adjusting the first and second pressure values, the high-pressure gas (P0) from the source is cooled to a temperature of between −50° C. and −30° C. by the at least one refrigerator, the source of pressurized gas delivers a pressurized gas, the pressure of which increases gradually as the gas is transferred to the tank to be filled.

Figures 2, 3, 4, 5:
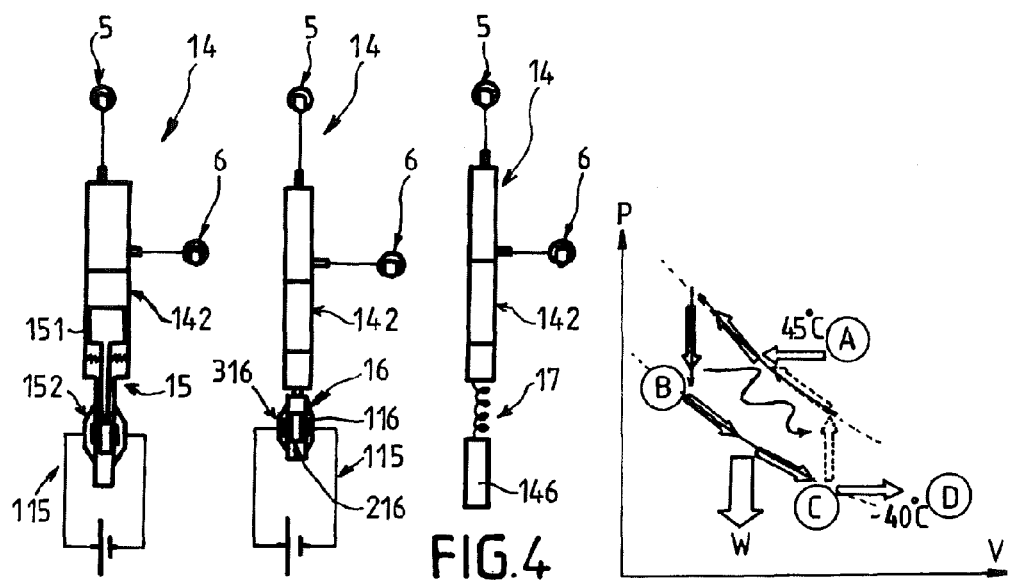
Figure 6:
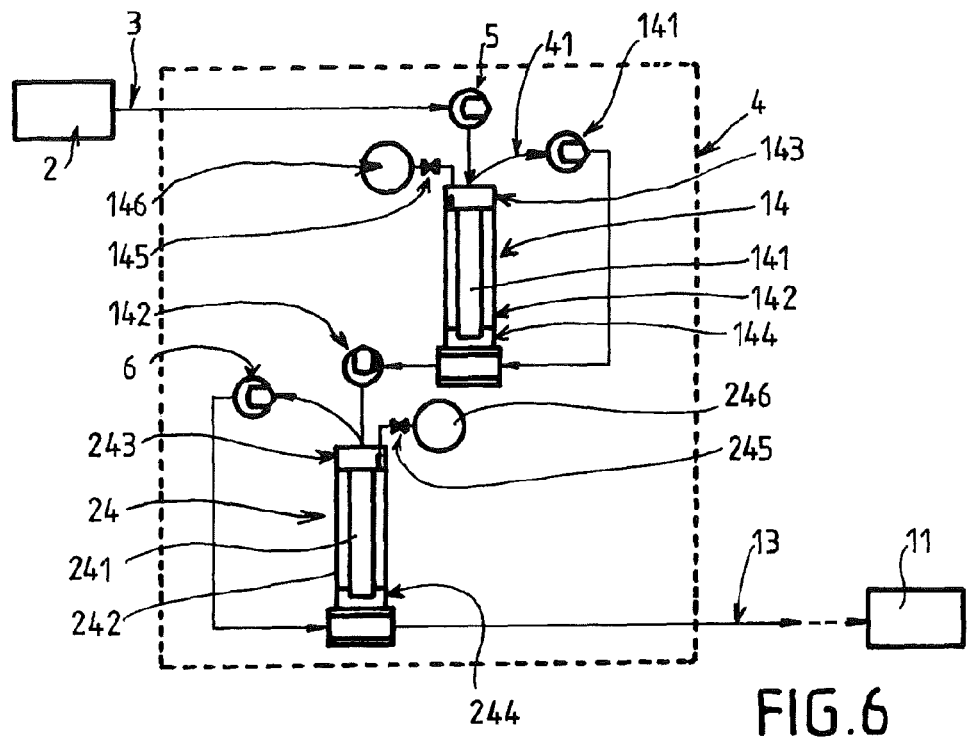
Figure 7:
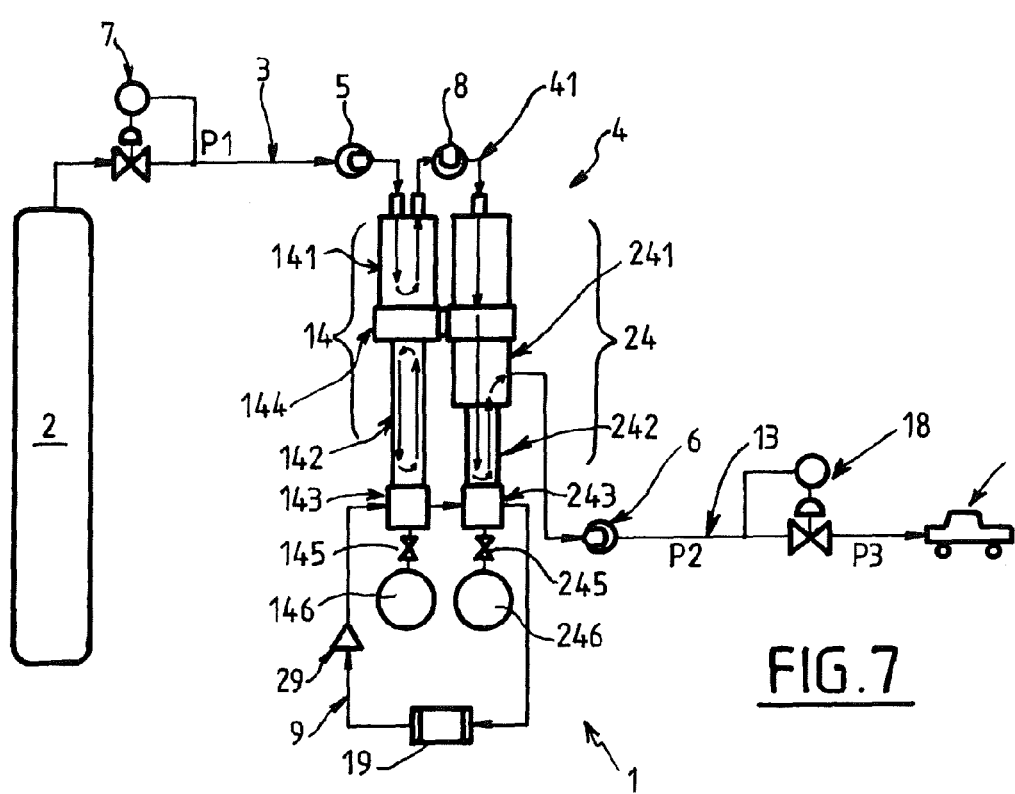
Figure 8:
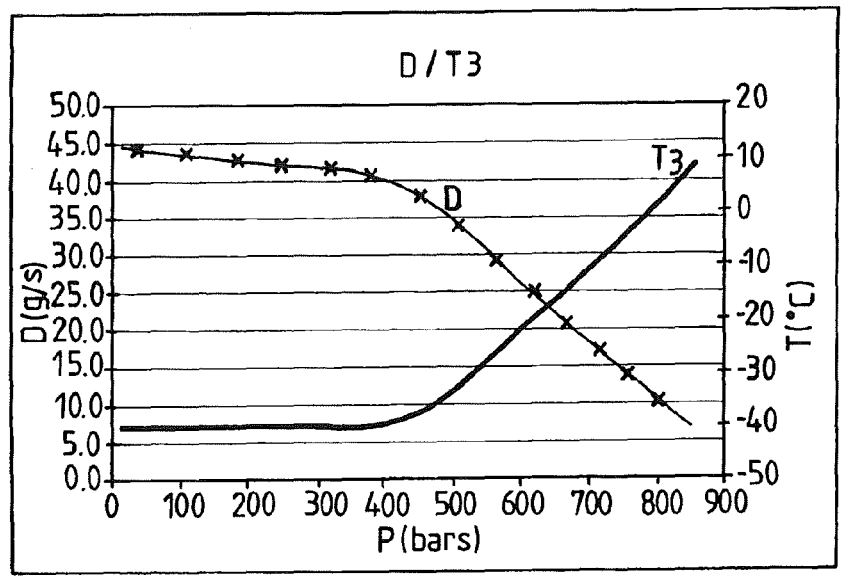
Figure 9:
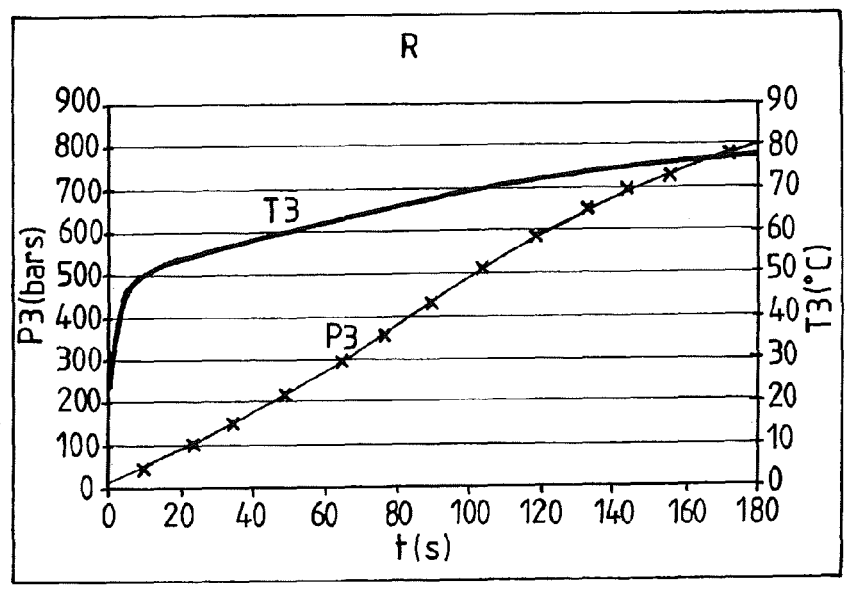
Figure 10:
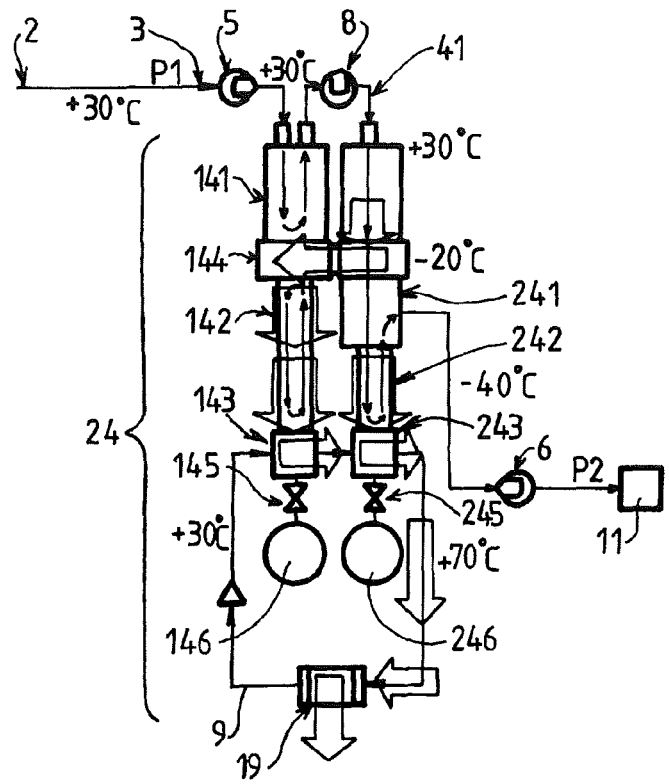
Figure 11:
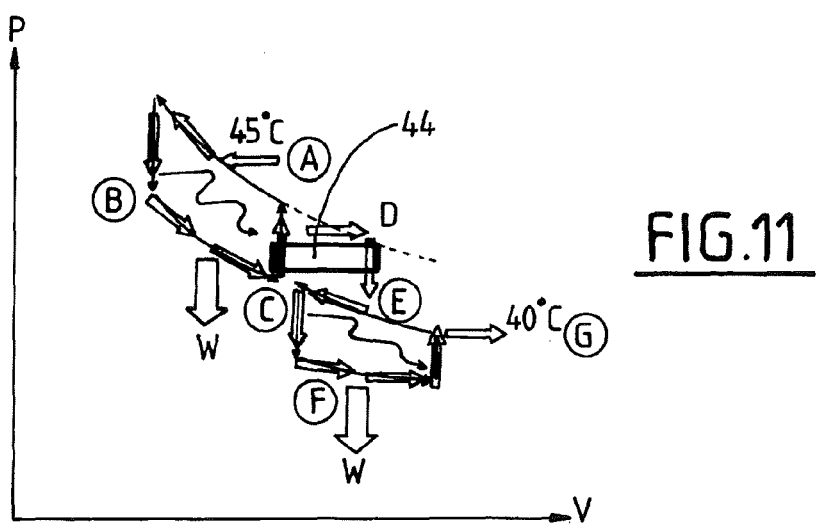

The invention may also relate to any alternative device or method including any combination of the features set out above or below. Other features and benefits are set out in the description below, provided with reference to the figures in which:

FIG. 1 is a partial schematic view showing the structure and operation of a first example of the filling device according to the invention, FIGS. 2 to 4 are schematic views of the structure of three possible variants of a refrigerator of the installation in FIG. 1, FIG. 5 is a schematic view showing a possible thermodynamic cycle that may be undergone by the gas within the filling installation in FIG. 1, FIG. 6 is a partial schematic view showing the structure and operation of a second example filling device according to the invention, FIG. 7 is a partial schematic view showing the structure and operation of a third example filling device according to the invention, FIG. 8 shows an example of flow-rate and temperature curves of the filling gas during a filling operation using the installation in FIG. 7, FIG. 9 shows an example of pressure and temperature curves of the gas in the tank to be filled during a filling operation using the installation in FIG. 7, FIG. 10 shows a detail of the installation in FIG. 7 showing an example of operation, FIG. 11 is a schematic view showing a possible thermodynamic cycle that may be undergone by the gas within the filling device in FIGS. 7 and 9.

The device for filling a tank 11 with a pressurized gas shown in FIG. 1 includes a source 2 of pressurized gas, for example one or more tanks storing hydrogen gas at a pressure of between 200 and 1200 bar and a circuit 3, 13 for transferring gas from the source 2 to at least one tank 11 to be filled. The tank 11 to be filled is for example part of a motor vehicle.

Naturally, as an alternative or in addition to the tank or tanks, the source 2 may include one or more compressors or any other suitable member for supplying pressurized gas.

The transfer circuit 3, 13 includes a gas expansion and cooling member 4 designed to lower the pressure and the temperature of the gas from the source to respective values set with a view to filling the tank 11. The gas expansion and cooling member 4 includes a refrigerator expanding the gas using a Stirling or Ericsson thermodynamic cycle. In the example shown, the expansion and cooling member 4 is a pulse-tube refrigerator 14. Such a pulse-tube refrigerator 14 conventionally includes a regenerator 141, one extremity of which is supplied selectively with gas from the source 2. A second extremity of the regenerator 141 is linked to a pulse tube 142. A buffer tank 146 is linked to the pulse tube 142 via an orifice controlled via a valve 145.

The operating principle of a pulse tube is as follows: the regenerator 141 is supplied with gas with variations in flow rate and pressure determined such as to subject the gas to a succession of compressions/expansions. The regenerator 141 absorbs calories from the gas during the cycle (for example by means of a hot heat exchanger located at one extremity of the regenerator) and supplies calories to the gas during another part of the cycle (for example by means of a cold heat exchanger located at another extremity of the regenerator or of the pulse tube). The buffer tank 146 supplies gas to the pulse tube 142 or receives gas from the pulse tube 142 depending on the pressure oscillations at the end of the pulse tube 142. The valve 145 forms an orifice ensuring a phase shift in the progression of the pressure oscillations between the buffer tank 146 and the pulse tube 142. The pulse tube 142 is thermally isolated from the outside such that the temperature of the gas therein varies with pressure. The gas reaches a relatively low temperature at a cold end 144 of the pulse tube 142 (for example between −50° C. and −30° C.) and a relatively high temperature at a hot end 143 of the pulse tube 142 (for example between 30° C. and 60° C.)

The refrigerator 14 is supplied selectively with gas from the source 2 via an upstream valve 5, for example a rotary valve, to generate pressure oscillations within the refrigerator 14 (for example sinusoidal waves).

As shown, the refrigerator 14 has an orifice at the cold end 144 that supplies a downstream pipe 13 selectively supplying a cold expanded gas to the tank 11 to be filled, i.e. the gas expanded and cooled by the refrigerator 14 that is intended to fill the tank 11 is extracted from the pulse tube 142. The downstream pipe 13 selectively linking the refrigerator 14 to the tank or tanks to be filled preferably includes a downstream control valve 6, for example a rotary valve, i.e. the refrigerator 14 works as an open circuit since the refrigerator 14 must be resupplied with gas by the source 2 to compensate for the gas supplied to the tank 11.

This architecture makes it possible to expand and cool the gas coming from the source 2 (for example to an initial ambient temperature and to an initial pressure of between 500 bar and 1000 bar) to a colder temperature and a lower pressure (for example to a temperature of between −50° C. and −40° C. and a pressure of between 100 bar and 300 bar).

This enables efficient expansion and cooling that is compatible with the quick filling of the tank or tanks 11.

FIG. 5 shows an example thermodynamic cycle (pressure P as a function of volume V) that can be implemented by the refrigerator 14 of the filling device. For example, the gas enters the refrigerator at 45° C. (reference sign A, FIG. 5) and is then compressed. The gas then undergoes isochoric expansion (to point B). The gas then undergoes an expansion (from B to C, FIG. 5) in which work W (calories or mechanical) is supplied to the outside of the refrigerator. Expanded cooled gas (for example to −40° C., see D, FIG. 5) is extracted to fill a tank 11. The remaining gas in the cycle is compressed isochorically and gas from the source 2 is injected into the cycle, which restarts (A).

Naturally, the pulse-gas refrigerator 14 can be replaced by any other type of refrigerator performing a Stirling or Ericsson thermodynamic cycle.

FIG. 2 shows, by way of example, a refrigerator 14 that is not a pulse-tube refrigerator but a refrigerator having a mechanism 15 with a movable mechanical piston 151, i.e. the gas is in contact with a sliding piston 151, the rod of the piston 151 being coupled to a bearing 152 connected to an electricity generating electrical circuit intended to generate electricity. As before, the refrigerator 14 applies a Stirling or Ericsson cycle to the gas. The gas is for example inserted via an upstream valve 5 and extracted downstream at a cold end via a downstream valve 6.

FIG. 3 shows another pulse-tube refrigerator 14 that differs from the one in FIG. 1 only in that the phase-shift mechanism with buffer tank 146 and linking orifice (valve 145) has been replaced by another phase-shift mechanism 16 comprising a free piston 116 held by a spring 216, the free piston 116 being coupled electrically to a bearing 316 linked to an electrical circuit 115.

Finally, FIG. 4 shows another pulse-tube refrigerator 14 that differs from the one in FIG. 1 only in that the linking orifice (valve 145) has been replaced by an inertance, i.e. an oblong tube, i.e. one with a small diameter and long length (diameter/length ratio between 100 and 10,000).

FIG. 6 shows another embodiment of the invention in which the gas expansion and cooling member 4 includes two pulse-tube refrigerators 14, 24 arranged in series.

A first refrigerator 14 is supplied with high-pressure gas from a source 2 via an upstream pipe 3 fitted with a valve 5. The first refrigerator for example has a known concentric structure with a cold end 144 and a hot end 143, i.e. the pulse tube 142 is arranged concentrically about the regenerator 141. As before, the first refrigerator 14 includes a phase-shift system comprising for example a buffer tank 146 and an orifice, for example controlled by a valve 145. The gas that has passed through the first refrigerator 14 is extracted from the inlet of the refrigerator 14 via an outlet pipe 41 fitted with a first valve 141. The outlet pipe 41 is linked to the inlet of the second refrigerator 24, for example via a second valve 142. Furthermore, the outlet pipe 41 exchanges heat with the cold end 144 of the first refrigerator 14 before supplying gas to the second refrigerator 24. The second refrigerator 24 for example also has a concentric structure, i.e. the pulse tube 242 is arranged concentrically about the regenerator 241. Furthermore, the second refrigerator 24 includes a phase-shift system comprising for example a buffer tank 246 and an orifice, for example controlled by a valve 245. The second refrigerator 24 has a cold end 244 and a hot end 243. The gas is extracted from the inlet extremity of the second refrigerator 24 via a downstream pipe 13 fitted with a downstream valve 6. The downstream pipe selectively supplies a tank 11 to fill it. The downstream pipe 13 undergoes a thermal exchange with the cold end 244 of the second refrigerator 24 before supplying the tank or tanks 11.

In other words, the gas from the source 2 is expanded and cooled by means of two expansion/cooling stages via two pulse-tube refrigerators 14, 24 arranged in series. Unlike the embodiment in FIG. 1, the gas is not extracted from the cold end 144, 244 of the refrigerators 14, 24, but undergoes a heat exchange with these cold ends. This makes it possible to expand and cool the gas coming from the source in order to fill the tanks 11.

Naturally, as a variant, instead of a heat exchange as shown in FIG. 6, the gas taken from the first refrigerator 14 and/or the second refrigerator could be taken from the cold end 144, 244 of the corresponding refrigerator.

Moreover, the architecture in FIG. 6 could include a single refrigerator (instead of two in series).

FIG. 7 shows another possible alternative embodiment.

In the embodiment in FIG. 7, the gas expansion and cooling member 4 includes two refrigerators 14, 24. The first refrigerator is a pulse-tube refrigerator and is supplied with gas from a source 2 of pressurized gas (for example between 800 bar and 1000 bar) via an upstream pipe 3 fitted with a valve 5, for example a rotary valve. The upstream pipe 3 preferably includes a pressure regulating valve 7 such as an expansion valve placed between the source 2 and the valve 5. This pressure regulating valve 7 selectively regulates the pressure of the gas supplied to the first refrigerator 14 at a specific value P1 (for example between 800 bar and 900 bar). The first refrigerator 14 includes a regenerator 141 and a pulse tube 142, and has a cold end 144 and a hot end 143. The pulse tube 142 is linked to a phase-shift system provided with a tank 146 via a valve 145 forming an orifice.

The second refrigerator 24 is also a pulse-tube refrigerator. The second refrigerator 24 includes a regenerator 241 and a pulse tube 242, and has a cold end 244 and a hot end 243. The pulse tube 242 is linked to a phase-shift system provided with a tank 246 via a valve 245 forming an orifice.

The hot ends 143, 243 of the first refrigerator 14 and second refrigerator 24 may be linked to a single cooling system, for example a coolant loop 9 fitted with a radiator 19 and/or a cooling unit such as a frigories store. The cooled fluid in the loop undergoes a heat exchange with the hot ends 143, 243, for example via a pump 29.

The second refrigerator 24 is supplied with gas from the first refrigerator 14 via an outlet pipe 41 fitted with a transfer valve 8, for example a rotary valve. More specifically, the second refrigerator 24 is supplied with gas from the inlet extremity of the first refrigerator 14, i.e. the gas flows through an open circuit inside the regenerator 141 of the first refrigerator, symbolized by the arrows in FIG. 7. Moreover, in the pulse tube 141 of the first refrigerator 14, the gas effects a closed cycle symbolized by a loop of arrows in FIG. 7.

The cooled expanded gas is extracted from the cold end 241 of the second refrigerator 24. This cooled expanded gas supplies the tank or tanks 11 via a downstream pipe 13 fitted with a valve 6, for example a rotary valve. As shown, the downstream pipe 13 also preferably includes a pressure regulating valve 18, such as a reducing valve, to control or stabilize the pressure P3 of the gas supplied to the tank 11 at a specific value (for example between 100 bar and 200 bar).

This architecture also enables the supply of a cooled high-pressure gas intended for rapid high-pressure filling.

FIG. 10 shows a detail of the device in FIG. 7 showing an example of possible operation.

The tank 11 of the vehicle can be filled with hydrogen gas in less than three minutes. For example, the tank 10 is empty in the initial state (initial pressure 10 bar) and the pressure thereof needs to be increased to 700 bar. This operation involves compressing the hydrogen in the tank 11. This causes significant heating of the tank 11. To compensate for this temperature increase, one solution involves filling the tank with cooled gas, for example at −40° C. In this case, for example, the temperature of the gas in the tank 11 will not exceed 80° C.

The filling method may involve transferring the hydrogen gas to the tank 11 from a very high-pressure storage facility, that may for example reach 1000 bar.

As shown in FIGS. 7 and 10, the device creates a specific pressure difference P1−P2 (difference between the pressure P1 at the inlet of the expansion and cooling member 4 and the pressure P2 at the outlet of this latter). The mass flow rate supplied by the expansion and cooling member 4 depends on the opening/closing speed (rotation) of the upstream, transfer and downstream valves 5, 8, 6.

This mass flow rate supplied by the expansion and cooling member 4 also depends on the upstream pressure P1.

The refrigerating power, i.e. the capacity to supply cold gas, depends on the pressure ratio P1/P2 between the inlet and the outlet.

To control the flow rate and the temperature of the gas supply to the tank 11, the input and output pressure setpoints P1, P2 can be adjusted using the upstream and downstream regulating valves 7, 18.

The rotational speed of the upstream, transfer and downstream valves 5, 8, 6 can also be adjusted to control the flow rate if the pressure setpoints P1/P2 are insufficient.

A filling example is described below with reference to FIG. 7. Before filling, the regulating valves (expansion valves) 7 and 18 are closed. The pressure in the source 2 is for example maximum, typically 1000 bar.

In a first phase, the upstream regulating valve 7 is opened at a specific pressure setpoint P1, for example at 800 bar, while the downstream regulating valve 18 is kept closed. In this case, the member 4 is filled at the setpoint pressure P1.

The upstream, transfer and downstream valves 5, 8, 6 are then opened/closed at a specific frequency (for example at a rotary frequency of 50 Hz).

As the downstream regulating valve 18 is closed, there is no pressure difference between the input P1 and the output P2 (i.e. P1−P2=0). As a result, no gas flows into the tank 11, i.e. the upstream, transfer and downstream valves 5, 8, 6 turn without outputting gas.

The downstream regulating valve 18 is then opened at a specific pressure setpoint P2 (for example 400 bar). The pressure difference between the upstream and downstream of the expansion and cooling member 4 P1−P2 is established, i.e. the expansion and cooling member 4 is then supplying a pressurized gas flow to the tank 11.

The pressure P3 of the tank 11 to be filled increases. The pressure P3 inside the tank 11 to be filled may exceed the pressure setpoint P2 downstream of the downstream regulating valve 18. From this moment, although the downstream regulating valve 18 is fully open, the pressure P2 outputted from the expansion and cooling member 4 increases. This reduces the refrigeration power and flow capacity of the expansion and cooling member 4. Furthermore, the pressure of the gas in the source 2 drops. Thus, the pressure in the source 2 may drop below the pressure setpoint P1 of the upstream regulating valve 7. If this occurs, although the upstream regulating valve 7 is fully open, the upstream pressure P1 drops. This also lowers the cooling and flow capacity of the expansion and cooling member 4.

To compensate for the drop in flow and cooling capacity of the expansion and cooling member 4, the rotational speed of the valves 5, 8, 6 may be increased. Indeed, an increase in the frequency of the compression/expansion sequences makes it possible to increase the gas flow rate outputted from the expansion and cooling member 4.

Conversely, the loss of refrigeration power is not compensated by managing the valves 5, 8, 6 in this way, i.e. the expansion and cooling member 4 is then supplying the tank 11 with increasingly cold gas.

These phenomena are illustrated in FIG. 8, which shows an example curve of flow rate D (in grams per second) and temperature T3 (in ° C.) of the gas supplied to the tank by the expansion and cooling member 4 as a function of the pressure P of the tank 11 to be filled. Thus, if the pressure P3 of the tank 11 reaches approximately 400 bar, the flow rate D of the filling gas drops and the temperature T3 thereof increases.

FIG. 9 illustrates the variation in the pressure P3 (in bar) and of the temperature T3 (in ° C.) of the gas inside the tank 11 during filling. FIG. 7 shows how the expansion and cooling member 4 makes it possible to achieve a high pressure (800 bar) in the tank 11 in less than three minutes, without thereby reaching excessively high temperatures (the temperature does not exceed 80° C. on completion of filling).

FIG. 10 is a schematic view of an example of operation of the expansion and cooling member 4 in FIG. 7. This latter includes two refrigerators 14, 24 forming two gas refrigeration and expansion stages. The first refrigerator 14 is a pulse-tube refrigerator operating conventionally, while the second refrigerator 24, which is also a pulse-tube refrigerator, is effectively a gas expansion member.

The first refrigerator 14 is used to cool the cold heat exchanger of the pre-cooling exchanger of the second refrigerator 24, i.e. the cold end 144 of the first refrigerator 14 is in heat exchange relationship with a hot heat exchanger rigidly connected to the regenerator 241 of the second refrigerator 24.

The gas coming from the source arrives upstream 3 at a pressure P1, for example 1000 bar, and at an ambient temperature (for example 30° C.). The upstream valve 5 allows the gas to enter the first refrigerator 14. A portion of the gas leaves the first refrigerator 14 at the same temperature (30° C.) and at a lower pressure (for example 600 bar) via the output pipe 41 fitted with the transfer valve 8.

The inside of the first pulse-tube refrigerator 14 is then subject to a variable pressure wave from 600 bar to 1000 bar.

When the gas enters and leaves the first pulse-tube refrigerator 14, the lost pressure energy thereof is converted into thermal energy, taken from the hot heat exchanger of the hot end 143. This energy extraction cools the cold-end exchanger 144. As shown in FIG. 10, the cold end 144 of the first refrigerator is in heat exchange relationship with the regenerator 241 of the second refrigerator 24 and thereby absorbs the calories from the gas entering the second refrigerator 24. Although the hot part around the refrigerator 141 is open, the cold part of the pulse-tube 142 of the first refrigerator is closed, i.e. the cold gas never leaves the pulse tube 142. The gas coming out of the top part of the first refrigerator 14 to supply the second refrigerator 24 is therefore at the same temperature as the incoming gas on account of the regenerator 141. The stage of the pulse tube 142 therefore does not supply cold gas.

The gas therefore enters the second refrigerator 24 at an intermediate pressure (for example 600 bar) between the input pressure P1 and the output pressure P2. This gas leaves the second refrigerator 24 at a lowered low temperature (for example −40° C.) and at a lowered output pressure P2 (for example 400 bar). The second refrigerator 24 is then subject to a variable pressure wave from 400 bar to 600 bar.

The gas returning to the second refrigerator 24 is first cooled to an intermediate temperature (−20° C.) by an exchanger cooled by the cold end of the first refrigerator 14. Pressure energy is then extracted from this gas in the pulse tube 241 of the second refrigerator 24. This gas is then outputted at a colder temperature (−40° C.). The cold part of the second refrigerator 24 is then fully opened, unlike the first refrigerator 14.

The energy extracted as heat at the hot heat exchangers of the two refrigerators can be evacuated for example using a water circulation loop 9 and a radiator 19 or a cooling unit (for example heating the water from 30° C. to 70° C.)

The pressure waves can be synchronized in the refrigerators 14, 24 using the valves 5, 8, 6. The upstream and downstream valves 5, 6 are opened at the same time, while the transfer valve 8 is closed, and vice versa. When the valves 5, 6, 8 are opened, a gas flow is generated by the volumes of the machines being connected together. This results in pressure equilibrium and a mass transfer. The rotation of the valves 5, 6, 8 at a given frequency generates pressure waves that are nearly square at low frequency and nearly sinusoidal at high frequency.

FIG. 11 is a schematic view of the thermodynamic cycle that can be implemented by the device in FIG. 7 (pressure P as a function of volume V).

For example, the gas enters the first refrigerator 14 at 45° C. (reference sign A, FIG. 11) and is then compressed. The gas then undergoes isochoric expansion (to point B). The gas then undergoes an expansion (from B to C, FIG. 11) in which work W (calories or mechanical) is supplied to the outside of the refrigerator. Gas from the first refrigerator 14 supplies the second refrigerator 24 (see D and E). Frigories are supplied from the first refrigerator to the second refrigerator 24 (reference sign 44). The gas also performs a work cycle in the second refrigerator 24 (compression from E to C then isochoric expansion, then expansion F with energy extraction W before finally being extracted at a low temperature (G, −40° C.)

The device according to the invention advantageously uses a compression/expansion wave, controlled by rotary valves or distributors, and may be implemented with the internal components conventionally used in ordinary Stirling machines.

The device according to the invention makes it possible to create a moderate, non-zero gas flow in the cold part, such as to create a cold gas flow to the outside of the refrigerator, which causes the pressure in this latter to drop.

The compression/expansion cycles required in Stirling and Ericsson cycles are performed by different portions of gas, which are introduced into the refrigerator as the gas flows. This provides an expansion function. Although it sets out design architecture similar to Gifford-McMahon and Solvay cryo-coolers, the invention proposed generates compression/expansion waves using purge (expansion) and filling (compression) cycles in the cold part, in place of pressure and flow rate oscillations in a closed circuit, which represents a different operating principle.

The invention claimed is:

1. A device for filling a tank with pressurized hydrogen, comprising a pressurized-gas source and a circuit for transferring gas from the source to the tank, the transfer circuit including a member for expanding and cooling the gas in order to lower a pressure and temperature of the gas from the source to respective values determined with a view towards filling the tank, wherein:
   the gas expansion and cooling member includes at least one refrigerator that expands the gas by means of a Stirling or Ericsson thermodynamic cycle;
   the refrigerator is selectively supplied with gas from the source; and
   at least a portion of the cooled and expanded gas supplied to the tank is extracted from the refrigerator.

2. The device of claim 1, wherein the refrigerator is a thermoacoustic expansion valve.

3. The device of claim 1, wherein the refrigerator is a "pulse tube" expansion valve.

4. The device of claim 1, wherein the gas expansion and cooling member includes at least one refrigerator comprising a cold end at least a portion of the gas supplied to the tank is taken from a gas outlet at the cold end.

5. The device of claim 1, wherein:
   the gas expansion and cooling member includes at least one refrigerator comprising a cold end;
   at least a portion of the gas supplied to the tank is taken from a zone of the refrigerator other than the cold end; and
   the gas that is taken from a zone of the refrigerator other than the cold end is cooled by heat exchange with said cold end.

6. The device of claim 1, wherein:
   the at least one refrigerator comprises a first refrigerator and a second refrigerator each of which expands and cools the gas using a Stirling or Ericsson thermodynamic cycle;
   each refrigerator has a respective cold end;
   at least a portion of the gas supplied to the tank is taken from a zone of the first refrigerator other than the cold end thereof and supplies gas to the second refrigerator; and
   at least a portion of the gas supplied to the tank is taken from the cold end of the second refrigerator.

7. The device of claim 6, wherein the cold end of the first refrigerator is in heat exchange relationship with the second refrigerator in a zone of the second refrigerator other than the cold end thereof.

8. The device of claim 1, wherein the gas expansion and cooling member includes at least one pulse-tube refrigerator including a regenerator supplied selectively with gas from the source, a pulse tube linked to the regenerator, and a phase-shift mechanism linked to the pulse tube, the pulse-tube refrigerator having a cold end and a hot end.

9. A method for filling a tank with pressurized hydrogen, comprising transferring the pressurized gas from a source of pressurized gas to the tank via a gas transfer circuit, the pressurized gas from the source is expanded and cooled before it enters the tank to be filled via at least one refrigerator expanding the gas using a Stirling or Ericsson thermodynamic cycle.

10. The method of claim 9, wherein:
    the at least one refrigerator is supplied selectively with gas from the source and in that the expanded; and
    cooled gas supplied to the tank has passed through the at least one refrigerator.

11. The method of claim 10, wherein the source of pressurized gas includes a recipient containing the gas at a pressure of between 200 and 1200 bar.

12. The method of claim 11, wherein before supplying the at least one refrigerator, the pressure of the gas coming from the source is adjusted to a first specific pressure below a pressure of the source.

13. The method of claim 12, wherein the first specific pressure is 20 to 100 bar less than the pressure of the source.

14. The method of claim 13, wherein the at least one refrigerator expands the gas to a second specific pressure between 100 bar and 300 bar.

15. The method of claim 14, wherein a flow rate and/or a temperature of the gas supplied to the tank is controlled by adjusting values of the first and second specific pressures.

16. The method of claim 10, wherein the source of pressurized gas includes a compressor supplying the gas at a pressure of between 200 and 1200 bar.

17. The method of claim 16, wherein before supplying the at least one refrigerator, the pressure of the gas coming from the source is adjusted to a first specific pressure below a pressure of the source.

18. The method of claim 17, wherein the first specific pressure is 20 to 100 bar less than the pressure of the source.

19. The method of claim 18, wherein the at least one refrigerator expands the gas to a second specific pressure between 100 bar and 300 bar.

20. The method of claim 19, wherein a flow rate and/or a temperature of the gas supplied to the tank is controlled by adjusting values of the first and second specific pressures.

21. The method of claim 10, wherein the source of pressurized gas includes a recipient containing the gas at a pressure of between 200 and 1200 bar and a compressor supplying the gas at a pressure of between 200 and 1200 bar.

22. The method of claim 21, wherein before supplying the at least one refrigerator, the pressure of the gas coming from the source is adjusted to a first specific pressure below a pressure of the source.

23. The method of claim 22, wherein the first specific pressure is 20 to 100 bar less than the pressure of the source.

24. The method of claim 23, wherein the at least one refrigerator expands the gas to a second specific pressure between 100 bar and 300 bar.

25. The method of claim 24, wherein a flow rate and/or a temperature of the gas supplied to the tank is controlled by adjusting the first and second pressure values.

26. The method of claim 9, wherein the gas at high pressure from the source is cooled to a temperature of between −50° C. and −30° C. by the at least one refrigerator.

* * * * *